May 28, 1968  R. B. FERTIG ETAL  3,385,971
RADIATION SENSITIVE FABRIC FLAW DETECTING SYSTEMS
Filed Aug. 6, 1965  2 Sheets-Sheet 1
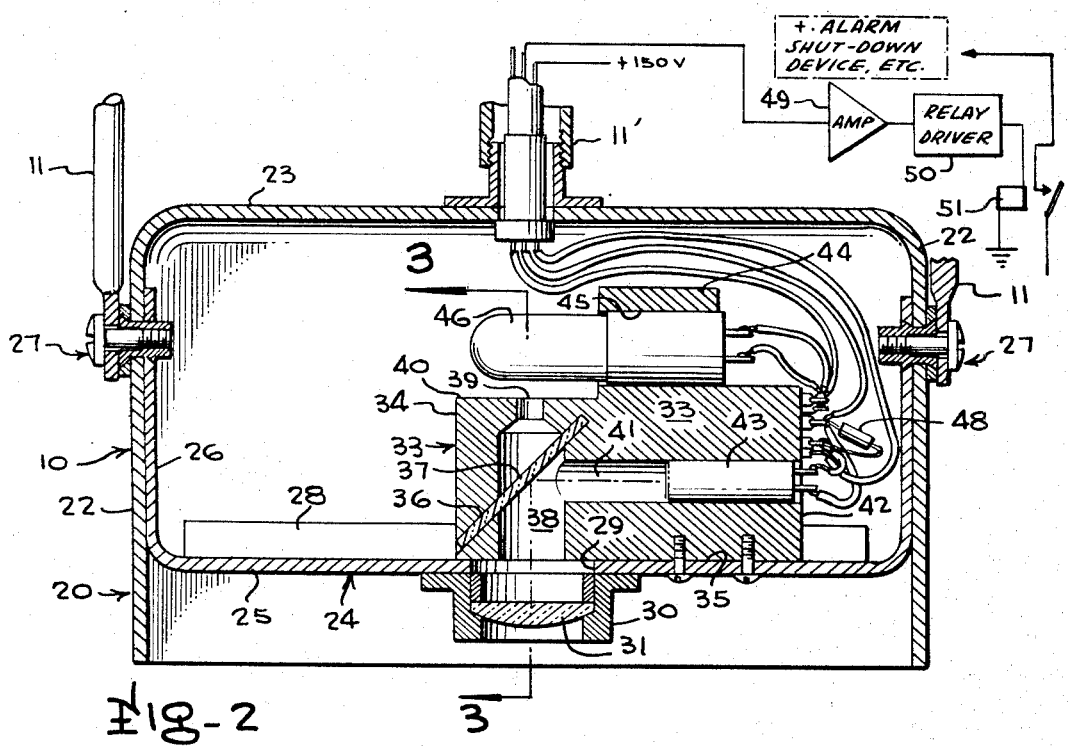
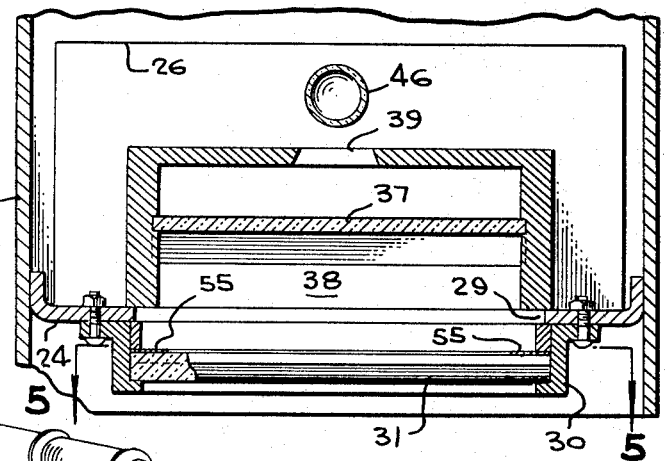
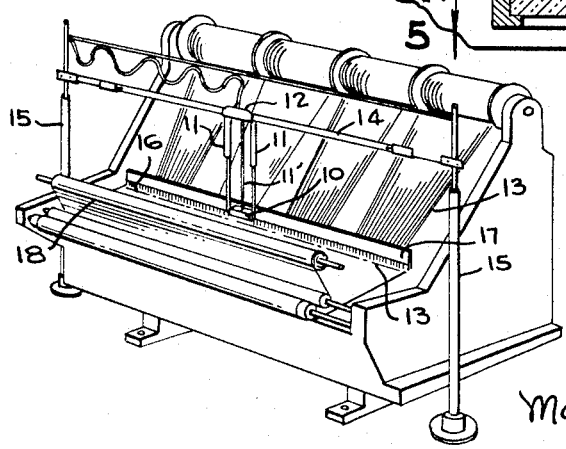
INVENTORS
RAYMOND BAINES FERTIG &
HENRY T. SESSIONS
BY Mason, Fenwick & Lawrence
ATTORNEYS

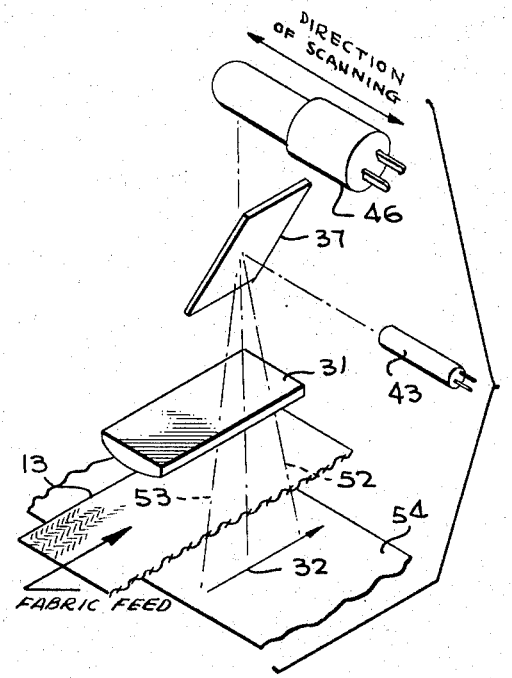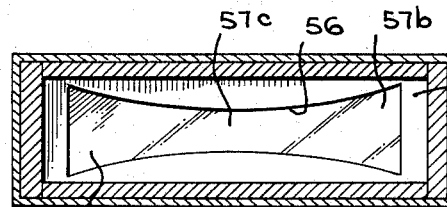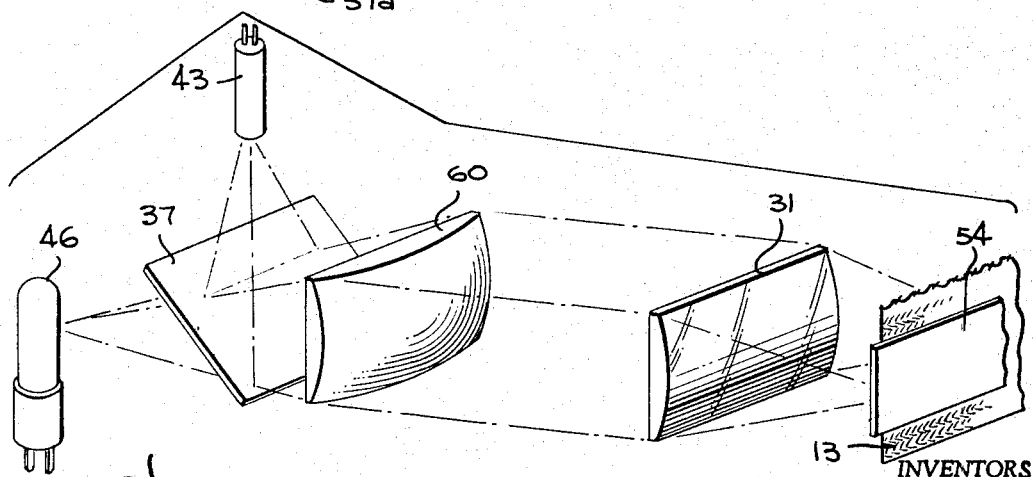

3,385,971
RADIATION SENSITIVE FABRIC FLAW DETECTING SYSTEMS

Raymond Baines Fertig, Saint Albans, and Henry T. Sessions, Ronceverte, W. Va., assignors to Appalachian Electric Instruments, Incorporated, Ronceverte, W. Va., a corporation of West Virginia
Filed Aug. 6, 1965, Ser. No. 477,749
11 Claims. (Cl. 250—219)

The present invention relates in general to fabric hole detecting apparatus to detect deliberately or accidentally formed holes, runs, or aperture-producing defects in fabric as it moves along a processing line, and more particularly to optical systems for apparatus for detecting flaws in textile fabric webs, by direction of light through the fabric under inspection toward a retro-reflective surface along diverging incident ray paths lying in a single principal plane to form an elongated line image and retro-reflection of light from any point in the line image back along the incident ray path and onto a photocell. Such apparatus may be used either as a stationary fabric inspecting installation or as a reciprocating scanning head moving transversely back-and-forth across fabric exiting from a knitting machine.

Heretofore, devices commonly known as "stop motion" devices for automatically detecting defects, particularly runs or holes in textile fabrics have been in wide use. Such devices commonly employ a scanning head which is reciprocated back-and-forth on a horizontal supporting bar over the knited fabric, usually in the zone between the needles and take-up role of warp knitting machines, to scan the width of the fabric as it passes from the needle zone. The scanning head customarily includes one or more photoelectric cells, a light source, lens means forming an image of a limited fabric zone on the photocell, and external connections for coupling photocell output signals to an amplifier circuitry. Typical examples of such devices may be found in U.S. Patents Nos. 2,711,094 and 2,859,603 to Edelman et al., and No. 3,046,767 to Nickell. Such stop motion scanning heads relied upon the difference between the reflected light intensity received from two closely adjacent zones of the fabric to attain a sufficiently great difference between normal fabric signals and defect signals to insure reliable defect detection and to avoid false stopping due to flutter or vibration of the fabric. It has been generally unsatisfactory to rely merely on single cell response to light increases through fabric defects, even where mirrors are provided beneath the fabric, as a means of defect detection. The use of multiple photocells and comparison circuitry has, of course, rendered the devices more complex and expensive, and has also introduced serious problems of properly matching electronic components.

Where a mirror was employed below the fabric, in conjunction with a movable scanner head, as in Patent No. 2,711,094, it was found that one cannot maintain sufficiently critical alignment to insure return of reflected light to the photocell. Further, the limited area of fabric surface to which the photocell was exposed through the lens provided only a very short and highly critical period when the fault, such as a run or hole, could affect the photocell conductivity, the light sensing region being in the nature of a narrow line formed by tracing of a small spot transversely across the fabric as the head was scanned across the width of the fabric. Also such devices have such restricted capacity to sense light variations as to render them unreliable for detecting flaws in multi-colored materials such as plaids.

The problems of the above-described nature encountered in flat fabric scanning have also limited practical use of such devices for scanning tubular or circular knit fabrics since the inability to develop sufficient sensitivity to reliably detect runs or holes by the additional light intensity admitted to the photocell by such runs or holes and the concurrent axial progression and rotation of the knit fabric tube as it leaves the needles rendered it difficult to devise flaw detectors suitable to be structural environment encountered in circular knitting devices or the conditions involved in sensing tubular fabric.

Heretofore, fabric hole detecting apparatus involving the use of retro-reflective material on one side of the fabric to be scanned and a light source, semi-transparent mirror, photocell, and cylindrical lens to direct light toward the fabric along diverging incident ray paths in a principal plane forming an elongated line image of several inches in length and retro-reflecting the light admitted through aperture defects in the fabric back along the incident ray path to the photocell has been disclosed in patent application, Ser. No. 417,697, filed jointly by Lawrence Creigh Nickell and Raymond Baines Fertig on Dec. 11, 1964. While the system therein disclosed permits detection of fabric aperture defects occurring anywhere along the line image produced by the incident light, such systems are not uniformly sensitive for small holes at different points along the light line, the system being most sensitive to holes in the middle of the trace or light line and decreasing in sensitivity at locations nearer the ends of the trace. This is due to such factors as the light path becoming longer away from the principal optical axis through the centers of the lens and line image, causing the light intensity to vary in accordance with the inverse square law, increased losses due to reflection as the angle of incidence increases relative to the principal plane of the retro-reflective surface, loss of sharp focus at the ends of the line image, and other causes. Increased reliability of detection of holes at any point in the line image and simplification of the electronics of the amplifier circuitry responding to the photocell output signals can be achieved by progressively increasing the light collecting ability of the cylindrical lens in directions toward the ends of the lens from the optical center thereof.

An object of the present invention therefore is the provision of novel fabric hole detecting apparatus employing a cylindrical lens, which is highly reliable in operation for fabric holes located anywhere along an elongated image zone sensed thereby.

Another object of the present invention is the provision in fabric hole detecting apparatus wherein light emanating from a substantial point source is spread by a cylindrical lens along divergent paths to produce a line image of light at the fabric and light passing through defects in the fabric are reflected bact to a photo-detector wherever the line image encounters a flaw to enhance flaw detection, of means for varying the light collecting ability of the lens over the length of the line image to provide substantially uniform sensitivity along the line image.

Another object of the present invention is the provision of a novel fabric hole detecting apparatus of the type described in the immediately preceding paragraph, wherein a light mask is provided on a surface of the cylindrical lens having a light admitting opening aligned with the longitudinal medial axis of the lens shaped to admit progressively greater quantities of light therethrough in zones progressing toward the longitudinal ends of the lens.

Other objects, advantages, and capabilities of the present invention will become apparent from the following detail description, taken in conjunction with the accompanying drawings illustrating several embodiments of the invention.

In the drawings:

FIGURE 1 is a diagrammatic perspective view of a fabric hole detecting scanning apparatus embodying the present invention, shown in association with a warp knitting machine;

FIGURE 2 is a vertical longitudinal section view of the scanner head of the fabric hole detector embodying the present invention;

FIGURE 3 is a vertical transverse section view of the scanner head, taken along the line 3—3 of FIGURE 2;

FIGURE 4 is a diagrammatic perspective view of the basic optical components of the scanner head illustrating the principles of operation thereof;

FIGURE 5 is a section view taken along the line 5—5 of FIGURE 3, and

FIGURE 6 is an optical diagrammatic view of a modification of the present invention.

The apparatus of the present invention is of the type which includes a cylindrical lens optical system which produces a defect signal (i.e. the light return to the photocell signifying presence of a run, a hole or a similar defect in the fabric under inspection) having a sufficiently increased amplitude relative to the normal signal representing the light intensity received by the photocell from normal fabric areas as to permit reliable detection of holes or similar aperture conditions with a single photocell and in some instances without amplification circuitry for the photocell output. This apparatus may be used as a moving device scanning over stationary or moving fabric, or as a stationary device inspecting a zone of selected width through which moving fabric passes, or as a moving or stationary device for detecting holes in tubular knit material either immediately following knitting of the tube at the needles or upon drawing of the material through an inspection station in substantially flat condition. This significantly increased defect signal/normal signal ratio arises from the conjoint action of the cylindrical lens through which light is spread along divergent paths in a plane perpendicular to the fabric surface to define a line light image on the fabric and the use of retro-reflection back-up material behind the fabric.

Retro-reflective material is a material which effects reflection or return of light to the source along the same path as the incident light rays regardless of the angle of incidence. That is to say, the rays reflected by the material return along a path which substantially parallels the incident ray path, unlike normal reflection in which the reflected ray is symmetrical to the incident ray in relation to the perpendicular at the point of incidence. This type of reflection is most commonly accomplished through the use of small, spherical lenses or lenticulae that are placed over a specular reflecting surface. If the retrodirective reflective system is properly constructed, light passing through the lenticulae focuses on the specular reflecting surface, is reflected back through the small lenses, and returns in essentially the same direction from which it came. The path of retro-reflective light is similar by degree to the path of incident light, so that materials that reflect light-retro-directively return a maximum reflective signal toward the point of origin with a minimum of incident energy. Since ordinary surfaces either scatter light or reflect most of it at an angle equal to the angle of incidence, retro-reflective light can be one hundred times or more stronger than ordinary reflected light. The system is therefore auto-collimating, every ray being reflected in the direction of incidence regardless of the particular angular position of the element. Examples of such retro-reflective material are "Scotchlite" brand reflective sheeting or tape manufactured by Minnesota Mining and Manufacturing Co.

The desired substantial uniformity in sensitivity of the detection system over the whole length of the line image zone produced by the cylindrical lens is achieved by providing an opaque light mask on the flat upper or inner face of the lens having an elongated aperture aligned with the axis of curvature of the lens which progresses from a selected minimum width at its longitudinal center to a larger width at its longitudinal ends. The aperture in the mask is so sized as to progressively increase the light collecting ability of the lens for points spaced toward the ends from the longitudinal center of the lens from the central optical axis so as to overcome the light intensity losses along light paths located nearer the edges of the group of diverging ray paths and thereby achieve substantially uniform sensitivity.

A specific embodiment of the invention as a scanning head for scanning a knit fabric web on a warp knitting machine is illustrated in FIGURES 1–5. Referring to these figures, the scanning head 10 is supported in the usual fashion on a depending pair of arms 11 from a suitable carriage 12 which runs back-and-forth transversely across the width of the fabric 13 on a channel or supporting rail 14 mounted on vertical supporting posts 15. The scanning head is designed to continuously inspect the fabric passing through the scanning zone, indicated generally by broken line 16, as the fabric travels from the needles 17 to the take-up roll 18, to immediately sense runs, holes or similar flaws in the fabric and stop the knitting machine upon occurrence of such a flaw.

The scanning head 10 comprises an outer casing 20, which may be drawn aluminum, in the form of a downwardly opening box, having vertical sides 21 and ends 22 and a horizontal top wall 23. An assembly plate 24 is secured within the outer casing 20, and includes a horizontal panel 25 corresponding substantially to the internal horizontal cross-section of the outer casing to nest therein, long ascending end flanges 26 secured by suitable fasteners 27 to the outer casing 20 providing connections for the lower ends of the arms 11, and short side flanges 28. An opening 29 is provided at an intermediate location in the panel 25 to form an optical aperture, and a lens mounting tube 30 is fixed to the panel 25 in alignment with the opening 29 and extending below the panel to support the lens 31. The lens 31 is a plano-convex cylindrical lens arranged in this embodiment with its axis of curvature disposed parallel to the direction of fabric feed from the needles 17 to the takeup roll 18 or perpendicular to the direction of scanning head travel along the rail 14, to spread light from a substantially point light source along diverging ray paths lying in a single plane perpendicular to the fabric plane and parallel to the axis of curvature of the lens to form an elongated line image at the fabric plane, for example of at least about one inch in length and as much as 5 or 6 inches in the case of stationary heads inspecting moving fabric webs, as indicated by the arrow 32 in FIGURE 4. It will be appreciated that other lens configurations than the plano-convex lens illustrated in the drawings may be used so long as they produce the desired fanning out of light rays to produce a line image from a point light source.

Mounted on the panel 25 and extending above the same within the outer casing 20 is a lamp and cell mounting block 33 providing in convenient form a single body to rigidly support in proper alignment all the optical components of the system other than the cylindrical lens 31. The mounting block 33 is cut from the front end wall 34 thereof along a 45° angle to the surface of the front wall 34 and bottom wall 35 to form a kerf 36 of appropriate width and depth to receive and fix in position a semitransparent mirror 37. Before insertion of the mirror 37 or beam splitter, a bore 38 is formed in the block 33 from the bottom wall 35 to a point near the top of the front wall 34, and a narrower bore 39 is formed through the surface 40 to provide a masking aperture of small size forming a substantially point source. It will be appreciated of course that a thin masking disk may be inserted, if desired, in the bore 38 near the top thereof to provide the desired small opening. A photocell housing bore 41 is also drilled from the rear wall 42 of the block 33 to the bore 38 at right angles to the latter in alignment with the portion of the semi-transparent mirror 37 lying in the bore 38, to house a photocell 43, for example a cadmium sulfide photocell. A vertical extension portion 44, of the block 33 rising above the surface 40 is provided with a bore 45 paralleling the bore 41 to house a suitable lamp 46, the portion 44 terminating in rearwardly spaced relation to the front wall 34 to provide a recess or rabbet into which the bulb of the lamp projects to dispose the lamp filament in alignment with the axis of bore 39. Suitable terminals may be fixed on the rear wall 42 of the block 33 to anchor conductors from the lamp 46 and photocell 43 before they are lead out of the casing 20 through the cable 11' to the amplifying circuitry. As indicated in FIGURE 2, the photocell 43 may be connected through a resistor 48, for example of 470,000 ohms, to a 150 volt D.C. source and to an amplifier 49, whose output controls a relay driver 50, such as a thyratron, a flip-flop, a one-shot multivibrator, or similar known means, having a relay 51 in its output circuit to energize an alarm, shut-down device, or other output device. The responsive circuitry is such that, when light of appropriate intensity strikes the photocell 43, the resistance of the cell decreases, causing an increase in current through the resistor 48, resulting in a pulse which is coupled to the input of the amplifier 49 to actuate the control relay 51.

It will be understood that with such an optical system, the light rays emanating from the lamp 46 will be restricted to a suitable small diameter simulating a substantially point source by the bore 39, or the masking disk if used, and will pass through the semi-transparent mirror 37 and be directed by the cylindrical lens 31 in a plane paralleling the axis of curvature of lens 31 along divergent ray paths, the limits of which are indicated at 52 and 53 in FIGURE 4, toward the fabric 13 to form a line image 32 at the fabric zone. Immediately beneath the fabric 13 at the fabric scanning zone is located a strip of retro-reflective material, indicated at 54 in FIGURE 4, of the type previously described, which is fixed on a suitable flat surfaced backing or support and spans the width of the fabric in alinement with the scanning head. The strip of retroreflective material is of sufficient width to span the length of the line image 32, so that incident light rays arriving along any incident ray axis (or angle of incidence) which is transmitted through a run or a hole in the fabric will be re-directed back toward the lens 31 along an axis paralleling and substantially coincident with the incident ray. Thus, the retro-reflected ray will follow the incident ray axis back to the semi-transparent mirror 37 and will be reflected to the photocell 43 in bore 41 to increase conductively through the photocell and supply a pulse to the amplifier to activate the alarm or stop motion shut-down device.

In order to compensate for the reduction in light intensity which would occur near the edges or limits 52, 53 of the set of divergent ray paths due to the longer light paths in these regions as well as the other causes previously mentioned, there is provided on the upper flat surface of the lens 31 a light mask 55, best shown in FIGURE 5, having a specially shaped elongated aperture 56 therein which is wider near the longitudinal ends thereof than at its center. In one exemplary embodiment involving a cylindrical lens having a focal length of about 44 millimeters, a width of about 1 inch, and a length of about 3 inches, with a semi-transparent mirror spaced about 44 millimeters from the lens and from the light source and photocell, a satisfactory mask aperture 56 may have a length of about 2½ inches, a minimum width at the center of about ⅜ inch and a maximum width at its ends of about ¾ inch, with the lateral edges of the mask aperture discribing an arc whose radius is about 4¼ inches. In this manner, the light collecting ability of the lens in the region of the wider mask aperture regions 57a, 57b is sufficiently greater than that in the narrower central region 57 thereof to compensate for reduction in light intensity due to increase in light ray path length through the regions 57a and 57b as well as losses due to reflection with increased angle of incidence and loss of sharp focus and achieve substantially uniform sensitivity to holes occurring anywhere along the light image.

It will be appreciated that the above-described optical system can be used in any of the fabric detecting systems disclosed in said copending application, Ser. No. 417,697, such as the moving scanning head system disclosed in FIGURES 1 to 4 of said copending application, the multiple head system of FIGURE 5 thereof, on the circular knit fabric scanning systems of FIGURES 6 to 13 of said application, and may be used with any of the amplifier circuitry disclosed therein.

Further, the use of such scanning apparatus is not limited to detection of holes or similar aperture conditions in fabrics, but may also be used to advantage for sensing flaws or similar variations in webs of sheet material of various types, such as detection of flaws in the nature of dark spots, light spots, thin spots and flaws produced by abnormal molecular chains in plastic resins or other imperfections causing a sensible change in the light transmitted through the plastic or other material.

A variation of the above-described optical system is illustrated in FIGURE 6, wherein the components corresponding to those illustrated in the embodiment of FIGURES 1–5 are designated by the same reference characters. In the system of FIGURE 6 there is interposed in the light path between the cylindrical lens 31 and semi-transparent mirror 37 a spherical lens 60 cut in a rectangular shape similar to the cylindrical lens 31. The purpose of the spherical lens 60 is to produce a more uniformly focused light line to assist in achieving a more uniform response to holes or light-altering conditions at any point along the light lines at the image plane. This is achieved, of course, at the cost of a more complex, and thus more expensive, optical system and the requirement that the two lenses 31 and 60 are each about the same length as the light line.

In the operation of the systems of FIGURE 6, the light rays from the lamp 46 pass through the mirror 37 to the spherical lens 60 where the light is collimated by the spherical lens 60 and passed on to the cylindrical lens 31. The cylindrical lens 31 focuses the rectangular beam of light into a sharply focused line of nearly uniform intensity which strikes the retro-reflective material 54. This light is reflected back from the material 54, passes through both lenses 31 and 60 and strikes the mirror 37. The mirror 37 which is mounted at substantially 45° to the light beam, reflects the returning light to the photocell 43. It should be noted that the light strikes the retro-reflective material 54 at approximately a 90° angle at all points along the light line which causes the response of the retro-reflective material to be much more uniform since at a 45° angle the returned light can be attenuated by as much as 40%.

While several modifications of the present invention have been particularly shown and described, it will be apparent that various modifications may be made within the spirit and scope of the invention, and it is desired, therefore, that only such limitations be placed on the invention as are imposed by the prior art and set forth in the appended claims.

What is claimed is:

1. Detecting apparatus for detecting holes and selected light modifying conditions in webs of material while the material is moving along a processing path and producing output signals upon occurrence of such selected conditions comprising a detector head including a substantially point source of light, an elongated lens having a cylindrical surface symmetrical with an axis of curvature paralleling the longitudinal axis of the lens for directing light rays from the source along incident ray paths toward the material to form a line image of light at the material spanning a selected distance, retro-reflective means disposed on the opposite side of said material from said detector head positioned to receive light from said source along any of said incident ray paths intercepted by said selected conditions in the material and retro-reflect the same back along its incident ray path, photocell means in said detector head, a semi-transparent mirror between said lens and light source to transmit light from said source toward said lens and to reflect any of said retro-reflected light rays to said photocell means, light mask means for rendering the intensity of said retro-reflected light returned to said photocell means substantially uniform for all points along said line image, and means responsive to a selected level of light activation of said photocell means to generate an output signal indicative of detection of said selected conditions.

2. Detecting apparatus for detecting holes and like selected light modifying conditions in webs of material while the material is moving along a processing path and producing output signals upon occurrence of such selected conditions comprising a detector head including a substantially point source of light, an elongated lens having a cylindrical surface defining an axis of curvature paralleling the longitudinal axis of the lens for spreading light rays from said source substantially uniformly along divergent incident ray paths lying in a single plane through said axis of curvature to form a line image of light at the material to be inspected spanning a selected distance, retro-reflective means disposed on the opposite side of said material from said detector head positioned to receive light from said source along any of said incident ray paths intercepted by said selected conditions in the material and retro-reflect the same back along its incident ray path through said lens, photocell means in said detector head, a semi-transparent mirror between said lens and light source to transmit light from said source toward said lens and to reflect any of said retro-reflected light rays to said photocell means, light mask means between said lens and said mirror, having an elongated light aperture therein aligned with said longitudinal axis shaped to substantially equalize light intensity of retro-reflected light reflected to said photocell means along any of said ray paths, and means responsive to a selected level of light activation of said photocell means to generate a signal indicative of detection of said selected conditions.

3. Detecting apparatus for detecting holes and like selected light modifying conditions in webs of material while the material is moving along a processing path and producing output signals upon occurrence of such selected conditions comprising a detector head including a substantially point source of light, an elongated lens having a cylindrical surface defining an axis of curvature paralleling the longitudinal axis of the lens for spreading light rays from said source substantially uniformly along divergent incident ray paths lying in a single plane through said axis of curvature to form a line image of light at the material to be inspected spanning a selected distance, retro-reflective means disposed on the opposite side of said material from said detector head positioned to receive light from said source along any of said incident ray paths intercepted by said selected conditions in the material and retro-reflect the same back along its incident ray path through said lens, photocell means in said detector head, a semi-transparent mirror between said lens and light source to transmit light from said source toward said lens and to reflect any of said retro-reflected light rays to said photocell means, light mask means between said lens and said mirror having an elongated light aperture therein aligned with said longitudinal axis shaped to substantially equalize light intensity of retro-reflected light reflected to said photocell means from all points along said line image, and means responsive to a selected level of light activation of said photocell means to generate a signal indicative of detection of said selected conditions.

4. Fabric flaw detecting apparatus for detecting runs, holes and like aperture defects in knit fabric while the fabric is moving relative to a fabric handling machine and producing defect signals upon occurrence of such aperture defects comprising a detector head including a substantially point source of light, an elongated lens having a cylindrical surface whose axis of curvature parallels the longitudinal axis of the lens for spreading light rays from said source in a substantially uniform pattern between selected angular limits symmetrical with a central optical axis through said lens and source and directing them along divergent incident ray paths lying in a single plane to form a line image of light at the fabric to be inspected spanning a selected distance, retro-reflective means disposed on the opposite side of said fabric from said detector head positioned to receive light from said source along any of said incident ray paths intercepted by an aperture defect in the fabric and retro-reflect the same back along its incident ray path, photocell means in said detector head, a semi-transparent mirrow between said lens and light source to transmit light from said source toward said lens and to reflect any of said retro-reflected light rays to said photocell means, light mask means between said lens and said mirror having an elongated light aperture therein aligned with the longitudinal medial axis of said lens of a width which varies progressively from a selected minimum at the longitudinal center thereof to a maximum at its ends to substantially equalize light intensity of retro-reflected light reflected to said photocell means along any of the ray paths lying between said selected angular limits, and means responsive to a selected level of light activation of said photocell means to generate a signal indicative of flaw detection.

5. Fabric flaw detecting apparatus for detecting runs, holes and like aperture defects in knit fabric while the fabric is moving relative to a fabric handling machine and producing defect signals upon occurrence of such aperture defects comprising a detector head including a substantially point source of light, an elongated lens having a cylindrical surface whose axis of curvature parallels the longitudinal axis of the lens for spreading light rays from said source in a substantially uniform pattern between selected angular limits symmetrical with a central optical axis through said lens and source and directing them along divergent incident ray paths lying in a single plane to form a line image of light at the fabric to be inspected spanning a selected distance, retro-reflective means disposed on the opposite side of said fabric from said detector head positioned to receive light from said source along any of said incident ray paths intercepted by an aperture defect in the fabric and retro-reflect the same back along its incident ray path, photocell means in said detector head, a semi-transparent mirror between said lens and light source to transmit light from said source toward said lens and to reflect any of said retro-reflected light rays to said photocell means, light mask means between said lens and said mirror having an elongated light aperture therein aligned with the longitudinal medial axis of said lens of a width which varies progressively from a selected minimum at the portions thereof passing light ray adjacent said central optical axis to a miximum in portions of said aperture passing light ray paths adjacent said limits, and means responsive to a selected level of light activation of said photocell means to generate a signal indicative of flaw detection.

6. Fabric flaw detecting apparatus as defined in claim 4, wherein said lens is of plano-cylindrical cross-section transversely of said longitudinal axis and includes a planiform surface of rectangular configuration facing said light source and mirror, and said light mask means being formed of a rectangular apertured sheet of opaque material which is substantially coincident peripherally with the periphery of said planiform surface and is mounted thereagainst.

7. Fabric flaw detecting apparatus as defined in claim 4, wherein said lens is of plano-cylindrical cross-section transversely of said longitudinal axis and includes a planiform surface of rectangular configuration facing said light source and mirror, and said light mask means being formed of a rectangular apertured sheet of opaque material which is substantially coincident peripherally with the periphery of said planiform surface and is mounted thereagainst, said light aperture in said light mask means having oppositely curving arcuate lateral edges extending convexly inwardly toward the longitudinal medial axis of the aperture.

8. Detecting apparatus as defined in claim 1, wherein said means for rendering the intensity of said retro-reflected light uniform comprises a second lens interposed between said elongated lens and said mirror having a spherical surface to substantially collimate light rays from said source to direct the same along parallel ray paths to said elongated lens to substantially equalize the lengths of the ray paths for the incident and retro-reflected light rays and orient the incident light ray paths substantially perpendicular to said retro-reflective means.

9. Detecting apparatus as defined in claim 1, wherein said means for rendering the intensity of said retro-reflective light uniform comprises a second lens interposed between said elongated lens and said mirror having a rectangular periphery corresponding substantially to the periphery of said elongated lens and a spherical surface to substantially collimate light rays from said source to direct the same along parallel ray paths to said elongated lens to substantially equalize the lengths of the ray paths for the incident and retro-reflected light rays and orient the incident light ray paths substantially perpendicular to said retro-reflective means.

10. Detecting apparatus for detecting holes and selected light modifying conditions in webs of material while the material is moving along a processing path and producing output signals upon occurrence of such selected conditions comprising a detector head including a substantially point source of light, an elongated lens having a cylindrical surface symmetrical with an axis of curvature paralleling the longitudinal axis of the lens for directing light rays from the source along incident ray paths toward the material to form a line image of light at the material spanning a selected distance, reflector means disposed on the opposite side of said material from said detector head positioned to receive light from said source along any of said incident ray paths intercepted by said selected conditions in the material and reflect the same back toward said lens, photocell means in said detector head, a semi-transparent mirror between said lens and light source to transmit light from said source toward said lens and to reflect said reflected light from said reflector means back through said lens to said photocell means, means for rendering the intensity of said reflected light returned to said photocell means substantially uniform for all points along said line image, said means for rendering the intensity of said reflected light uniform comprising a second lens interposed between said elongated lens and said mirror having a spherical surface to substantially collimate light rays from said source to direct the same along parallel ray paths to said elongated lens to substantially equalize the lengths of the ray paths for the incident and reflected light rays and orient the incident light ray paths substantially perpendicular to said reflector means, and means responsive to a selected level of light activation of said photocell means to generate an output signal indicative of detection of said selected conditions.

11. Detecting apparatus for detecting holes and selected light modifying conditions in webs of material while the material is moving through an inspection zone along a processing path and producing output signals upon occurrence of such selected conditions comprising a detector head including a substantially point source of light, an elongated lens having a cylindrical surface symmetrical with an axis of curvature paralleling the longitudinal axis of the lens for directing light rays from the source along incident ray paths toward the material at said inspection zone to form a line image of light at the material spanning a selected distance, photocell means in said detector head, a semi-transparent mirror between said lens and light source to transmit light from said source through said lens toward the material at said inspection zone and to direct light returning from said inspection zone back through said lens to said photocell means, means for rendering the intensity of said returning light directed to said photocell means substantially uniform for all points along said line image, said means for rendering the intensity of said returning light uniform comprising a second lens interposed between said elongated lens and said mirror having a spherical surface to substantially collimate light rays from said source to direct the same along parallel ray paths to said elongated lens to substantially equalize the lengths of the ray paths for the incident and returning light rays and orient the incident light ray paths substantially perpendicular to the incident surface of the material at all points along said line image, and means responsive to a selected level of light activation of said photocell means to generate an output signal indicative of detection of said selected conditions.

References Cited

UNITED STATES PATENTS

| | | | |
|---|---|---|---|
| 3,198,951 | 8/1965 | Lentze | 250—219 |
| 3,345,835 | 10/1967 | Nickell et al. | 66—166 |
| 3,056,032 | 9/1962 | Cannon | 250—219 |

WALTER STOLWEIN, *Primary Examiner.*